United States Patent [19]

Mortenson

[11] Patent Number: 4,865,340
[45] Date of Patent: Sep. 12, 1989

[54] TWO-WHEELED HAND TRUCK CONSTRUCTION

[75] Inventor: Carl N. Mortenson, Midland, Mich.
[73] Assignee: Magline Inc., Pinconning, Mich.
[21] Appl. No.: 207,941
[22] Filed: Jun. 17, 1988

Related U.S. Application Data

[62] Division of Ser. No. 77,744, Jul. 27, 1987, Pat. No. 4,790,547.

[51] Int. Cl.$^4$ .............................................. B62B 1/04
[52] U.S. Cl. .................................................. 280/47.27
[58] Field of Search .......................... 280/47.27, 47.28; 403/245, 246

[56] References Cited

U.S. PATENT DOCUMENTS

| | | | |
|---|---|---|---|
| D. 146,419 | 2/1947 | Peterson | D34/26 |
| 2,396,953 | 3/1946 | Kirchdorfer | 280/47.27 |
| 2,869,886 | 1/1959 | Wardell | 280/47.28 |
| 2,980,200 | 4/1961 | Kibby | 280/47.27 |
| 3,046,035 | 7/1962 | Nichols | 280/47.27 |
| 3,092,200 | 6/1963 | Chambers | 280/47.27 |
| 3,104,890 | 9/1963 | Hill | 280/47.27 |
| 3,193,123 | 7/1965 | Wouden | 280/47.27 |
| 3,997,182 | 12/1976 | Mortenson | 280/47.27 |
| 4,121,855 | 10/1978 | Mortenson | 280/47.29 |
| 4,235,449 | 11/1980 | Tarran | 280/47.28 |
| 4,275,894 | 6/1981 | Mortenson | 280/47.29 |
| 4,420,166 | 12/1983 | Law et al. | 280/5.24 |
| 4,563,014 | 1/1986 | Mortenson | 280/47.27 |

FOREIGN PATENT DOCUMENTS 882599 11/1961 United Kingdom ............ 280/47.27

Primary Examiner—Charles A. Marmor
Assistant Examiner—Eric Culbreth
Attorney, Agent, or Firm—Learman & McCulloch

[57] ABSTRACT

An improved two-wheeled hand truck, with a pair of horizontally spaced, vertically extending side rails, connected to form a primary frame, has axle-supporting brackets fixed to the lower end of each side rail and extending rearwardly therefrom to support an axle and a pair of wheels. An angle-shaped nose plate, having a forwardly extending load support platform, and an upturned rear wall, releasably mounts a generally T-shaped pedestal part with a post which is receivable within the side rail for releasably securing each of the side rails to the forwardly extending portion of the nose plate. A second rigid connection to resist pivoting of the nose plate is provided on each wheel supporting bracket, at a spaced distance rearwardly from each side rail for fixing the upturned portion of the nose plate to each bracket.

17 Claims, 2 Drawing Sheets

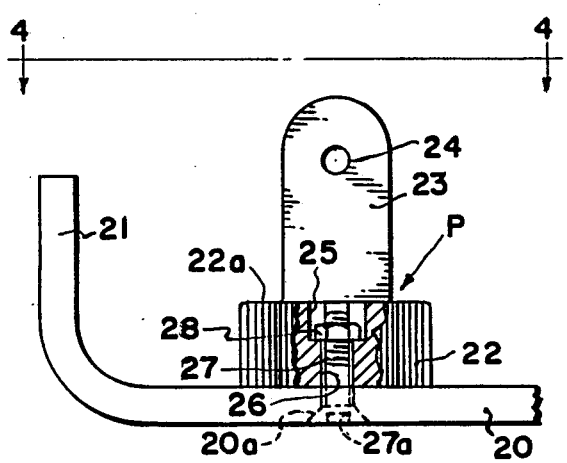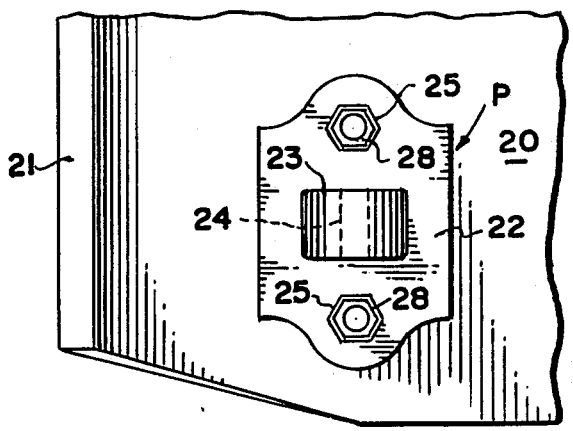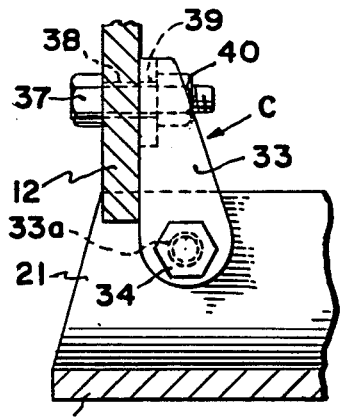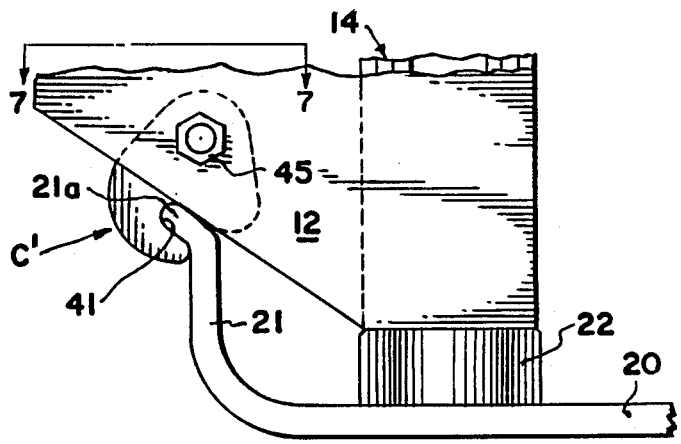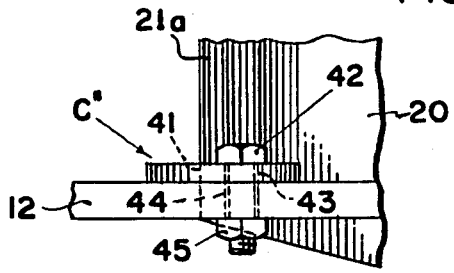

TWO-WHEELED HAND TRUCK CONSTRUCTION

This is a divisional of co-pending application Ser. No. 077,744 filed on July 27, 1987, now U.S. Pat. No. 4,790,547.

BACKGROUND OF THE INVENTION

This invention relates to two-wheeled hand trucks or dollies of the type wherein a load-supporting nose plate mounts to a primary frame which supports a pair of wheels in a manner so that the load can be received on the nose plate and transported, with the frame in a vertically inclined position.

Hand trucks of varying design have been patented by the assignee of the present invention and among them are U.S. Pat. Nos. 3,997,182; 4,121,855; 4,275,894; 4,420,166; and 4,563,014. These hand trucks, which have been constructed with a considerable number of die cast component parts for purposes of strength, have been sold widely.

Another prior hand truck of which applicant is aware uses a die-cast component consisting of wheel-supporting brackets integrated by a spanning front wall which serves as a load rest for a separate horizontal nose plate. In this latter construction, the front wall has raised bosses on which the side rails of a primary frame are secured by means of screws extending up from the bottom of the nose plate and through the bosses into blind bores provided in the side rails. The front wall further has rail engaging walls at its sides which are bolted to the side rails.

SUMMARY OF THE INVENTION

The hand truck of the present invention includes a primary frame, mounted on a pair of wheels supported by a pair of discrete wheel-supporting brackets which project rearwardly from the side rails of the primary frame. An angular nose plate has a forwardly projecting, load-supporting platform and a rear wall disposed rearwardly of the side rails of the primary frame. Generally T-shaped pedestal parts, having bases and reduced size, upstanding posts are removably mounted on the upper surface of the load-support platform, the posts being of complementary shape to, and received in, the hollow side rails. The pedestal posts secure to the side rails by means of laterally extending securing members which extend through laterally aligned openings provided in the side rails and the pedestal posts.

Clips or clamps removably mounted on the upturned rear portion of the nose plate fix the upturned portion of the nose plate to the axle-supporting brackets at spaced distances rearwardly of the side rails.

One of the primary objects of the present invention is to provide a hand truck which is so conceived as to use a fewer number of expensive die cast parts, and a greater number of aluminum parts, without in any way sacrificing the strength of the hand truck and reducing its load-bearing capability. In this respect, it should be noted that applicant, with the present construction, finds it possible to utilize nose plates formed of aluminum plate stock or extruded aluminum members, and contemplates the use of molded plastic nose plates.

Another prime object of the invention is to provide a method of securing a load-bearing, angle-shaped nose plate to a hand truck in a manner such that maximum flexibility in the selection of the length of the nose plate and the material from which it is constructed is achieved, the multiple securement system resisting any tendency of the nose plate to pivot and be damaged in a situation in which it is inadvertently dropped on its nose plate.

A further object of the invention is to provide cast aluminum pedestal parts, including bases on which the side rails of the primary frame are received, and posts which are shaped to be received with only sliding clearance within the lower ends of the side rails.

Another object of the invention is to provide a hand truck in which virtually all components thereof save the two axle supporting axle brackets can be formed of lightweight aluminum metal, rather than die cast material, with the consequent saving in manufacturing costs, and with the added attribute of providing a hand truck of lighter weight.

Still another object of the invention is to provide a hand truck utilizing an angle-shaped nose plate wherein a multiple nose plate securing structure includes pedestals for receiving and fixing the lower ends of the side rails, and rigid clips mounted on the upturned rear wall of the nose plate which removably fix the rear wall of the nose plate to the individual axle-supporting brackets at spaced distances rearward of the side rails to resist any tendency of the nose plate to pivot about said side rails.

A further object of the invention is to provide a very simple and practical hand truck of improved character which can be economically marketed, and effectively utilized to manually transport a wide variety of products.

Other objects and advantages of the invention will be pointed out specifically, or will become apparent from the following description when it is considered in conjunction with the appended claims and the accompanying drawings.

IN THE DRAWINGS

FIG. 3 is an enlarged, fragmentary, side elevational view of the nose plate and a pedestal part only, illustrating the manner in which the pedestal parts are releasably secured to the load-support platform;

FIG. 4 is a fragmentary, top plan view thereof;

FIG. 5 is an enlarged, fragmentary, front elevational view, taken on the line 5—5 of FIG. 1, illustrating one form of clip for securing each axle supporting bracket to the upstanding rear wall of the load-supporting nose plate;

FIG. 6 is an enlarged, fragmentary, side elevational view, showing an alternate form of rigid clip; and FIG. 7 is a fragmentary, top plan view taken on the line 7—7 of FIG. 6.

Figure 2:
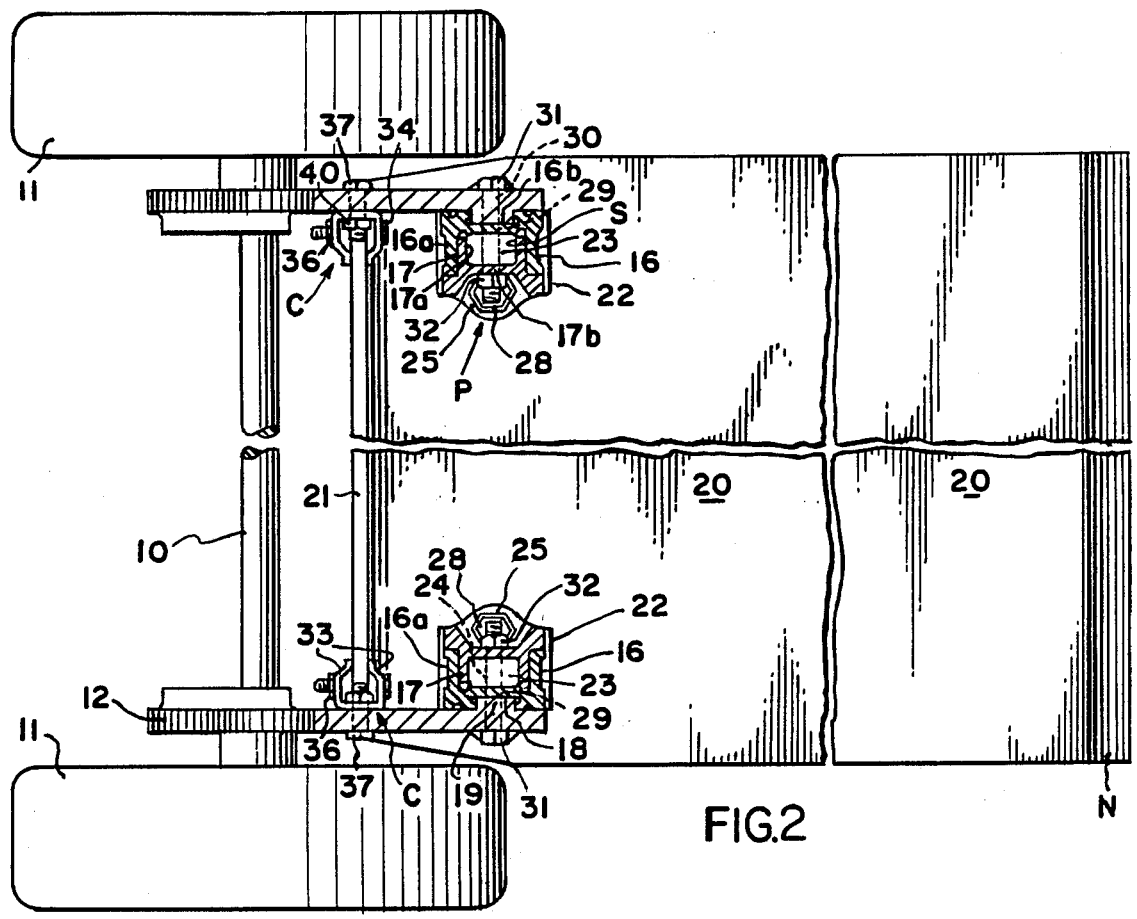
FIG. 2 is a sectional plan view, taken on the line 2—2 of FIG. 1.

Referring now more particularly to the accompanying drawings, and in the first instance to FIGS. 1-5 thereof, the hand truck of the present invention comprises an axle 10, supporting ground-engaging rubber-tired wheels 11 in the usual manner. Die cast axle and wheel-supporting bracket plates 12, have openings 13 in aligned pairs, and it will be noted that the axle 10 passes through the selected aligned pairs of the openings 13 in the usual manner, to support the wheels 11.

Each axle-supporting bracket 12 extends forwardly to mount to the lower end of a primary frame, generally designated F, which may be of the type disclosed, for example, in U.S. Pat. No. 3,997,182. The frame F comprises an open framework made up of generally vertical hollow side rail members 14, connected by horizontal brace rails 15 at vertically spaced intervals. As in the patent mentioned, the upper rail may comprise a handle for propelling the hand truck manually.

The side rails 14 are formed of extruded, generally U-shaped interfitting outer and inner members 16 and 17, in the usual manner. It will be noted that the elongate outer member 16 includes a pair of side legs 16a, connected by a web portion 16b, and the members 17 include a pair of side legs 17a, received within the legs 16a, and a connecting web portion 17b. As in previous constructions, such as the hand truck disclosed in the present assignees U.S. Pat. No. 3,997,182, the web portion 16b of each rail 14 is formed with a vertically extending groove, the lower portion of which functions as a keyway 18 for receiving a vertically extending laterally projecting key member 19, provided integrally at the front end of each bracket 12.

The hand truck is provided with an angle-shaped nose plate, generally designated N, having a load-support platform 20 which can be longer in length than previously, and an upturned rear wall 21 which is situated at a spaced distance rearwardly of rails 14. To removably connect the nose plate N in position, I have fabricated a pair of separate pedestal members, generally designated P, which are more particularly illustrated in FIGS. 3 and 4. Each of these comprises a base portion 22, cast with an upstanding post 23 having an opening 24 in its upper end. The base portion 22 is provided with hexagonal sockets 25, and openings 26 which enable bolts 27 and nuts 28 to secure the pedestals P securely in position. The load-supporting platform 20 is provided with the countersunk openings 20a, which each receive the head of a bolt 27, which has an Allen socket 27a and seats flush with the bottom of the load-supporting portion 20 of the nose plate N.

Figure 1:
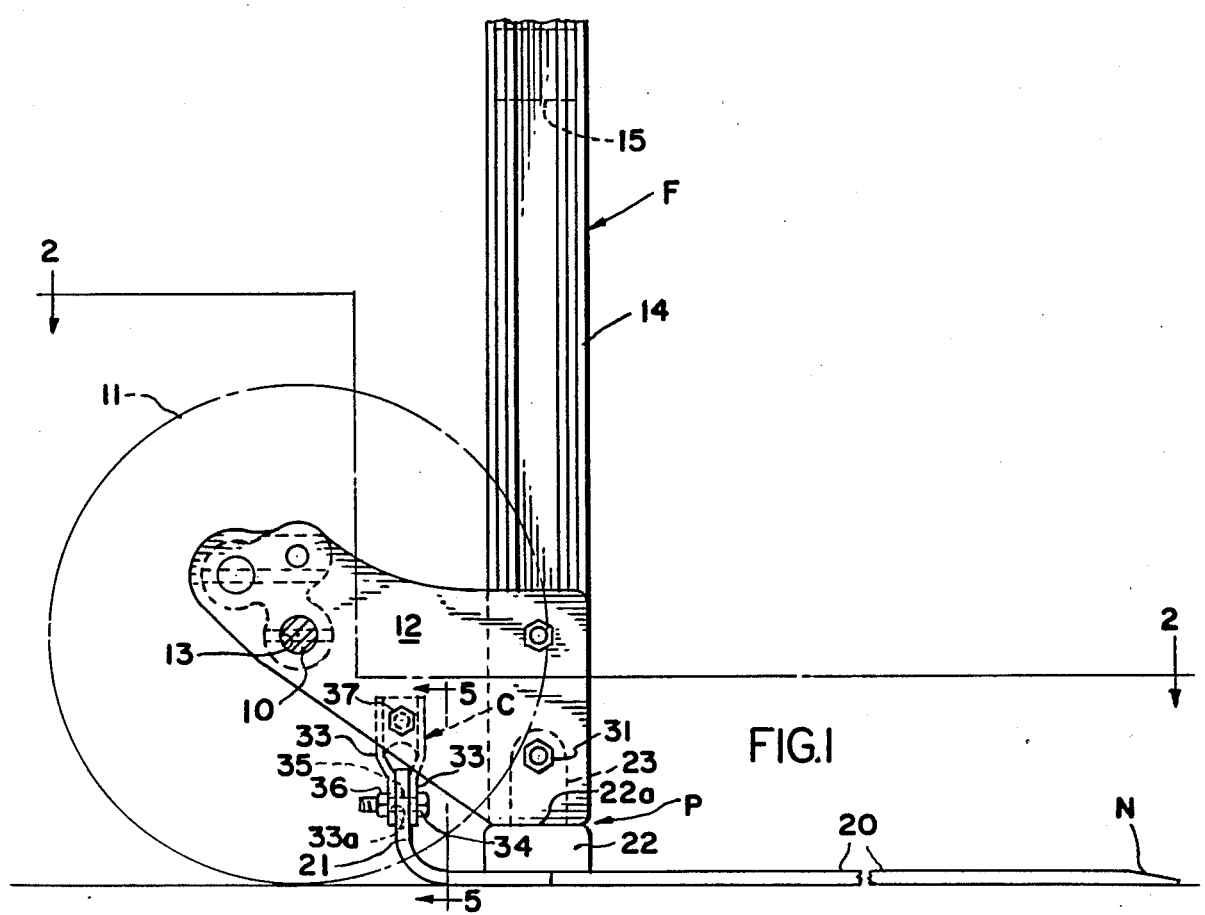
FIG. 1 is a fragmentary, side elevational view of the improved hand truck.

As FIG. 2 particularly illustrates, post 23 is of rectangular cross-section, and snugly fits the sockets S extending upwardly from the lower end of rails 14, which are formed by the surfaces of legs 17a and webs 17b and 16b. Laterally aligned openings 29, provided in the webs 16b and 17b are in alignment with the pedestal post openings 24, and with an opening 30 provided in each bracket 12, so that bolts 31, extending through the openings 24, 29 and 30, and nuts 32 can be used to secure the interfitting pedestal posts 23 in position. Bolts 31 and nuts 32 may be aptly termed clamp fasteners. FIG. 1 shows the side rails 14 and brackets 12, as received by the flat upper surface 22a of the base portions 22 of pedestals P, which forms a bearing surface therefor.

Finally, to further the immobile anchorage which has been achieved with the construction described, the upturned integral rear portions 21 of nose plate N are fixed to the brackets 12 rearwardly of the rails 14. This is accomplished by rigid clip members, generally designated C (FIGS. 1, 2 and 5), which in plan are U-shaped, as shown in FIG. 2, and have inturned parallel lower legs 33, with openings 33a, for receiving bolts 34 extending through openings 35 provided in the upturned wall 21, the bolts 34 being secured by nuts 36. The upper ends of clips C are secured to the brackets 12 by bolts 37, extending through openings 38 provided in the brackets 12, and openings 39 provided in the clips C, bolts 37 being retained by nuts 40.

An alternative clip construction is shown in FIG. 6 which makes it unnecessary to drill the nose plate wall 21. Here the clip, generally designated C', is hook-shaped and is provided with a downwardly and forwardly inclined slot 41 for receiving the rearwardly and upwardly turned upper edge 21a of the wall 21. As FIG. 7 indicates, each clip C' is removably fixed in position by a bolt 42, extending through an opening 43, provided in the clip C', and an opening 44 provided in the bracket 12, and extending to be retained by a nut 45.

THE OPERATION

The operation of hand trucks of this character is well-known, and need not be particularly described. Plainly, when changing or replacement of the nose piece N is contemplated, it is simply necessary to disengage clips C or C' or the bolts 31 and 37, and reengage clip C or C' or the bolts when a new nose piece N has been substituted for the nose piece being replaced. The pedestal mountings P in combination with the securement of the upturned walls 21, to the brackets 12 at a location spaced rearwardly from rails 14, provides a fixed, stable structure which permits the use of nose pieces N of differing character without the sacrifice of hand truck capability.

While one embodiment of the invention has been described in detail, it will be apparent to those skilled in the art that the disclosed embodiment may be modified. Therefore, the foregoing description in all aspects is to be considered exemplary, rather than limiting in any way, and the true scope of the invention is that defined in the following claims.

What is claimed is:

1. In an improved two-wheeled hand truck construction:
   a. a pair of horizontally spaced, vertically extending side rails connected laterally to form a hand truck frame and having handle means associated with the upper ends of said side rails;
   b. an axle supporting bracket fixed to the lower end of each side rail and extending rearwardly therefrom;
   c. axle and wheel means supported by said brackets rearwardly of said side rails;
   d. a nose plate structure having a forwardly extending load support platform with a load-engaging upper surface;
   e. said rails having sockets extending upwardly from their lower ends;
   f. generally T-shaped pedestal parts having bases and reduced size posts of reduced cross-section relative to said bases removably mounted on the upper surface of the load support platform of the nose plate structure adjacent the rear thereof, the posts being of complementary shape to and received in said sockets, and the side rails being received on said bases;
   g. laterally aligned openings provided in said side rails, brackets and posts; and
   h. securing means extending laterally through said openings to fix said posts to said side rails and brackets.

2. The construction of claim 1 wherein said load support platform has an upwardly extending rear portion and clip means, rearward of said side rails and mounted on the upwardly extending rear portion of said nose plate structure, removably fixes said rear portion of the nose plate to said brackets to resist any tendency of the noseplate to pivot about said side rails when the hand truck is inadvertently dropped on its nose.

3. The construction of claim 1 wherein each side rails is formed with a vertically extending keyway on its laterally outer face, each bracket has a key received in said keyway; and each bracket has an opening extending through said key to align with said lateral openings; each bracket being fixed to the side rail by said securing means.

4. The construction of claim 3 wherein said side rails are each formed of a pair of oppositely disposed U-shaped-in-section vertical members, with the legs of one U-shaped member telescopically received in the other to leave a generally rectangular in cross-section core space between them forming said socket, each post also being of a generally rectangular cross-section to be snugly received in said socket.

5. The construction of claim 1 wherein aligned vertical openings are provided in said bases and nose plate, and removable securing means extends up through said vertical openings to secure said forwardly extending portion of the nose plate to each base.

6. The construction defined in claim 2 wherein said rear portion of the nose plate structure has an upwardly and rearwardly inclined locking flange edge portion, and said clip means includes a hook-shaped plate with a downwardly and forwardly extending slot for receiving said edge, fixed to each bracket.

7. The construction defined in claim 2 wherein said clip means includes clamp plates fixed to each bracket having dependent clevis legs for receiving the upper edge of said rear portion of the nose plate; and securing means extends through said edge of the nose plate and clevis legs to fix the nose plate also to the brackets.

8. In an improved two-wheeled hand truck construction;
  a. a pair of horizontally spaced, vertically extending side rails connected laterally to form a hand truck frame;
  b. an axle supporting bracket fixed to the lower end of each side rail and extending rearwardly therefrom;
  c. axle and wheel means supported by said brackets;
  d. an angle-shaped nose plate structure having a forwardly extending load support platform and an upturned rear portion;
  e. means releasably securing said side rails to the forwardly extending portion of the nose plate structure; and
  f. securing means, fixed to each bracket at a spaced distance rearwardly from said side rails, for fixing the upturned portion of the nose plate structure to each bracket; said securing means comprising releasable clip means mounted on the upturned rear portion of said nose plate structure which removably fixed said upturned rear portion to said brackets.

9. The combination defined in claim 8 wherein the lower ends of the side rails are open and hollow, and said means for releasably securing the side rails to the forwardly extending portion of the nose plate structure comprises a generally T-shaped pedestal part for each side rail, the pedestal parts having a base with a flat upper surface releasably secured to the load-support platform of the nose plate structure, and a reduced size post complementally shaped to be snugly received in the lower ends of said hollow side rails, the side rails having flat lower surfaces received on the flat upper surfaces of said bases.

10. The construction of claim 9 wherein said posts have lateral openings and openings laterally aligned therewith are provided in said side rails, and said means releasably securing said side rails includes laterally extending fastening means extending through said openings.

11. The construction defined in claim 10 wherein said side rails are each formed of a pair of oppositely disposed, U-shaped extrusions, with the legs of one U-shaped extrusion telescopically received in the legs of the other to provide a generally rectangular core space between them, each post being of the same cross section and a size to be snugly received in said core space with only sliding clearance.

12. In an improved two-wheeled hand truck construction;
  a. a pair of horizontally spaced, vertically extending side rails connected laterally to form a hand truck frame;
  b. an axle supporting bracket at the lower end of each side rail and extending rearwardly therefrom;
  c. axle and wheel means supported by said brackets;
  d. a nose plate structure having a forwardly extending load support platform with a load-engaging upper surface;
  e. pedestal parts with upstanding posts having vertical axes, mounted on the upper surface of the load support platform of the nose plate structure adjacent the rear thereof, the posts and side rails being telescoped;
  f. laterally aligned openings provided in said brackets, side rails and posts; and
  g. fastener means extending laterally through said openings to fix said posts to said brackets and side rails.

13. The construction of claim 12 wherein said load support platform has an upwardly extending rear portion, and clip means mounted on the upwardly extending rear portion of each nose plate removably fixes said rear portion of the nose plate to said brackets at spaced distances rearward of said side rails to resist any tendency of the noseplate to pivot about said side rails.

14. The construction of claim 12 wherein each side rail is formed with a vertically extending keyway on its laterally outer face, each bracket has a key received in said keyway; and the opening provided in each bracket extends through said key.

15. The construction of claim 12 wherein said pedestal parts have bases and said side rails are received in bearing engagement on said bases.

16. The construction of claim 12 wherein a clamp fastener is passed through each side rail, the pedestal and each bracket, to releasably fix the side rail, pedestal, and bracket together rigidly.

17. The construction defined in claim 12 wherein the side rails have tubular lower ends to receive said upstanding posts.

* * * * *